E. A. STEVENS.
LINE LEVEL.
APPLICATION FILED JAN. 2, 1914.
1,116,641.
Patented Nov. 10, 1914.
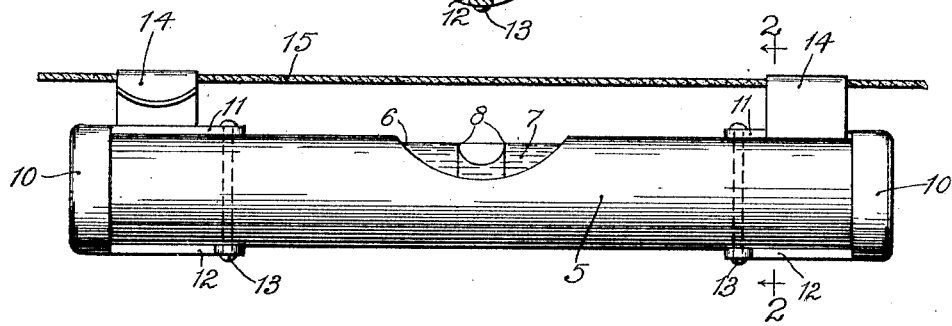
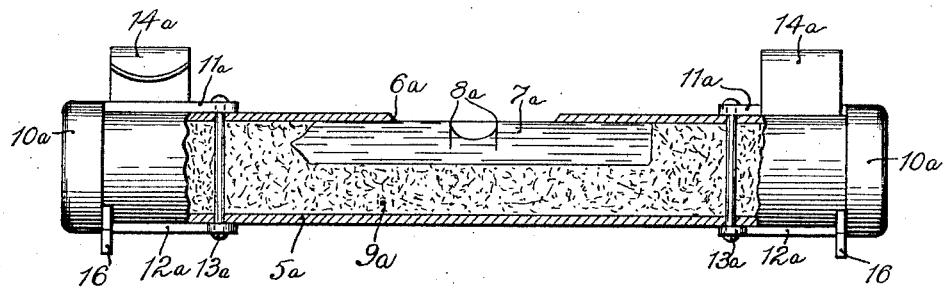
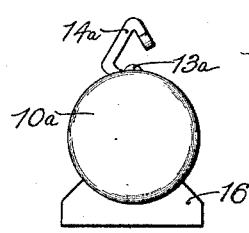
Witnesses:
Leonard E. Bogue
Leonard W. Novander
Inventor
Ernest A. Stevens
By Brown Williams Bell Hanson & Boettcher
Attorneys.

UNITED STATES PATENT OFFICE.

ERNEST A. STEVENS, OF NEWTON FALLS, OHIO.

LINE-LEVEL.

1,116,641. Specification of Letters Patent. Patented Nov. 10, 1914.

Application filed January 2, 1914. Serial No. 809,859.

*To all whom it may concern:*

Be it known that I, ERNEST A. STEVENS, a citizen of the United States, residing at Newton Falls, in the county of Trumbull and State of Ohio, have invented certain new and useful Improvements in Line-Levels of which the following is a full, clear, concise, and exact description, reference being had to the accompanying drawings, forming a part of this specification.

My invention relates to line levels and its object is to provide a spirit level of economical and durable construction. The device of my invention is not only provided with means for supporting it from a line, but will serve all of the purposes of the well-known old-style level, which is inherently more expensive to construct. Broadly, the device of my invention comprises a metal cylinder within which is supported a spirit tube, there being an aperture in the cylinder through which the spirit tube is visible. The ends of the cylinder are closed by caps of peculiar conformation, and formed integral with each cap is a supporting hook arranged to engage a line. By placing the level on the line at the center thereof where the deflection is equal toward both ends, the end points can be brought absolutely level, regardless of how taut the line may be pulled.

One embodiment of my invention hereinafter described is provided with lugs carried by the end caps, said lugs being provided with parallel lower edges designed to rest upon surfaces to be leveled. Thus, the level of my invention may not only be utilized by suspending it from a line, but the level may be supported by the aforesaid lugs.

My invention is more fully set forth by the following description and is illustrated in the accompanying drawings, in which—

Figure 1 is a side elevational view of a line level embodying my invention; Fig. 2 is a cross-sectional view taken on the line 2—2 of Fig. 1; Fig. 3 is a view similar to Fig. 1 of a level construction wherein the end caps are provided with lugs adapted to rest upon surfaces to be leveled, a portion of the cylinder comprising the level shown in Fig. 3 being broken away to more clearly reveal the inner construction, and Fig. 4 is an end view of one of the end caps with which the level shown in Fig. 3 is provided.

Similar characters of reference refer to similar parts throughout the several views.

Referring first to Figs. 1 and 2, I have illustrated at 5 a hollow metal cylinder, preferably of aluminum, provided at 6 with an aperture through which a spirit tube 7 supported within the cylinder 5 is visible, said spirit tube being provided with the hair-lines 8, as in ordinary level constructions. The cylinder 5 is preferably of comparatively small length in order that it may be easily carried in the pocket; in fact, in practice I find it desirable to have the entire line level weigh approximately one-half ounce and so constructed that it will take up approximately the same space as a fountain pen if carried in the pocket. The spirit tube 7 is embedded in and retained in position by the plaster of Paris 9 which fills the tube 5, said plaster when hardened serving effectually to retain the spirit tube in position.

Disposed upon each end of the cylinder 5 is a cap 10, and formed integral with each of said caps are the diametrically-opposite lugs 11 and 12, said lugs extending toward the middle of the cylinder 5. Passing diametrically through the cylinder 5 and the lugs formed integral with each one of the caps 10 is a rivet 13, which rivet serves to retain the cap and associated parts in position. Formed integral with the lug 11 of each end cap is a hook 14, the said hooks being adapted to engage a line 15 to suspend the line level therefrom. Attention is called to the fact that when the end caps 10 are in position upon the cylinder 5, the hooks 14 are oppositely-disposed with respect to each other, and thus there is less tendency for the line level to be accidentally disengaged from the line than would be the case if the hooks were otherwise disposed.

The line level shown in Figs. 3 and 4 is generally similar to the line level shown in Figs. 1 and 2, so I have applied to the parts shown in Figs. 3 and 4 the reference characters applied to the corresponding parts in Figs. 1 and 2, and in addition have added to each reference character the letter *a*. Attention is called to the fact that in the line level construction shown in Figs. 3 and 4, each of the end caps 10ª has soldered or otherwise secured thereto a lug 16, the said lugs having substantially parallel lower edges adapted to rest upon surfaces to be leveled. It will be seen that the level shown in Figs. 3 and 4 is not only capable of being utilized as a line level, but on account of the lugs 16 may also be made to serve the purpose of the ordinary levels now on the market.

The line level of my invention is extremely accurate and is capable of being manufactured at a very low price. The line level complete is very compact and may be carried around in the pocket, thus avoiding the inconvenience of carrying the ordinary levels which are extremely heavy and cumbersome.

What I claim as new and desire to secure by Letters Patent of the United States is:

1. A line level comprising a metal cylinder having an aperture therein, a spirit tube disposed in said cylinder and visible through said aperture, plaster of Paris in said cylinder surrounding said spirit tube, an end cap disposed over each end of said cylinder, each of said end caps comprising a pair of elongated ears integral therewith and arranged to engage the cylinder, a hook integral with each end cap arranged to engage a line, said hooks being oppositely disposed with respect to each other, and a rivet for retaining each of said caps in position, each of said rivets passing diametrically through the cylinder and the integral ears with which its associated cap is provided.

2. A line level comprising a metal cylinder having an aperture therein, a spirit tube disposed in said cylinder and visible through said aperture, plaster of Paris in said cylinder surrounding said spirit tube, an end cap disposed over each end of said cylinder, each of said end caps comprising a pair of elongated ears integral therewith and arranged to engage the cylinder, a hook integral with each end cap arranged to engage a line, said hooks being oppositely disposed with respect to each other, a rivet for retaining each of said caps in position, each of said rivets passing diametrically through the cylinder and the integral ears with which its associated cap is provided, and a lug carried by each of said end caps, said lugs comprising parallel lower edges adapted to rest upon surfaces to be leveled.

3. A line level comprising a cylinder having an aperture therein, a spirit tube disposed in the cylinder and visible through said aperture, an end cap disposed on each end of said cylinder, each of said end caps comprising a pair of ears integral therewith and arranged to engage the cylinder, a hook integral with each of said end caps and arranged to engage a line, and a rivet arranged to retain each end cap in position, each rivet passing diametrically through the cylinder and passing through the ears with which its associated cap is provided.

4. A line level comprising a cylinder having an aperture therein, a spirit tube disposed in the cylinder and visible through said aperture, an end cap disposed on each end of said cylinder, each of said end caps comprising a hook integral therewith arranged to engage a line, and a lug arranged to rest upon a surface to be leveled, the lugs with which the end caps are provided having parallel lower edges.

In witness whereof, I hereunto subscribe my name this 29 day of December, A. D. 1913.

ERNEST A. STEVENS.

Witnesses:
 FRANK B. HALL,
 D. M. HINE.

---

Copies of this patent may be obtained for five cents each, by addressing the "Commissioner of Patents, Washington, D. C."